United States Patent
Sparling

(10) Patent No.: US 10,969,849 B2
(45) Date of Patent: Apr. 6, 2021

(54) METHOD AND APPARATUS FOR IMPLEMENTING POWER MODES IN MICROCONTROLLERS USING POWER PROFILES

(71) Applicant: RENESAS ELECTRONICS AMERICA INC., Milpitas, CA (US)

(72) Inventor: Dale Sparling, Santa Clara, CA (US)

(73) Assignee: Renesas Electronics America Inc., Milpitas, CA (US)

(*) Notice: Subject to any disclaimer, the term of this patent is extended or adjusted under 35 U.S.C. 154(b) by 0 days.

(21) Appl. No.: 16/532,363

(22) Filed: Aug. 5, 2019

(65) Prior Publication Data

US 2019/0361510 A1 Nov. 28, 2019

Related U.S. Application Data

(63) Continuation of application No. 15/195,563, filed on Jun. 28, 2016, now Pat. No. 10,372,184.

(51) Int. Cl.
*G06F 1/28* (2006.01)
*G06F 9/30* (2018.01)
(Continued)

(52) U.S. Cl.
CPC .............. *G06F 1/28* (2013.01); *G06F 1/324* (2013.01); *G06F 1/3243* (2013.01);
(Continued)

(58) Field of Classification Search
CPC .... G06F 1/3296; G06F 1/3203; G06F 1/3206; G06F 1/324; G06F 1/3234; G06F 1/3243;
(Continued)

(56) References Cited

U.S. PATENT DOCUMENTS 7,562,233 B1  7/2009  Sheng et al.
8,464,082 B2  6/2013  Shibao
(Continued)

OTHER PUBLICATIONS

Final Office Action on U.S. Appl. No. 15/195,563 dated Nov. 1, 2018.
(Continued)

*Primary Examiner* — Ji H Bae
(74) *Attorney, Agent, or Firm* — Foley & Lardner LLP

(57) ABSTRACT

A method and apparatus for implementing power modes in microcontrollers (MCUs) using power profiles. In one embodiment of the method, a central processing unit (CPU) of the MCU executes a first instruction for calling a subroutine stored in a memory of the MCU, wherein the first instruction comprises a first parameter to be passed to the subroutine. Thereafter the CPU writes a first value to a first special function register (SFR) of the MCU in response to executing the first instruction, wherein the first value is related to the first parameter. The MCU operates in a first power mode in response to the CPU writing the first value to the first SFR. The CPU also executes a second instruction for calling the subroutine, wherein the second instruction comprises a second parameter to be passed to the subroutine. In response the CPU writes a second value to a second SFR of the MCU in response to executing the second instruction, wherein the second value is related to the second parameter. The MCU operates in a second power mode in response to the CPU writing the second value to the second SFR. The MCU consumes more power operating in the first power mode than it does when operating in the second power mode.

13 Claims, 3 Drawing Sheets

(51) Int. Cl.
- *G06F 1/324* (2019.01)
- *G06F 1/3234* (2019.01)
- *G06F 1/3296* (2019.01)
- *G06F 1/3203* (2019.01)
- *G06F 1/3206* (2019.01)

(52) U.S. Cl.
CPC ........ *G06F 1/3296* (2013.01); *G06F 9/30054* (2013.01); *G06F 9/30083* (2013.01); *G06F 9/30189* (2013.01); *G06F 1/3203* (2013.01); *G06F 1/3206* (2013.01); *G06F 1/3234* (2013.01); *G06F 9/30145* (2013.01); *Y02D 10/00* (2018.01)

(58) Field of Classification Search
CPC .... G06F 9/30101; G06F 1/28; G06F 9/30145; G06F 9/30054; G06F 9/30083; G06F 9/30189; Y02D 10/00
USPC .......................................... 713/300, 320, 322
See application file for complete search history.

(56) References Cited

U.S. PATENT DOCUMENTS

| | | | |
|---|---|---|---|
| 8,689,021 | B1 | 4/2014 | Bai et al. |
| 10,372,184 | B2 * | 8/2019 | Sparling ................. G06F 1/28 |
| 2002/0087896 | A1 | 7/2002 | Cline et al. |
| 2003/0065960 | A1 | 4/2003 | Rusu et al. |
| 2003/0226043 | A1 | 12/2003 | Hicok |
| 2004/0003300 | A1 * | 1/2004 | Malueg ................. G06F 1/28 713/300 |
| 2005/0076256 | A1 * | 4/2005 | Fleck ................. G06F 1/3203 713/320 |
| 2006/0053326 | A1 | 3/2006 | Naveh et al. |
| 2010/0064151 | A1 | 3/2010 | Saeki |
| 2012/0185703 | A1 | 7/2012 | Machnicki et al. |
| 2012/0218005 | A1 | 8/2012 | Chua-Eoan et al. |
| 2014/0149769 | A1 | 5/2014 | Brock et al. |
| 2014/0304685 | A1 | 10/2014 | Xie et al. |
| 2015/0310331 | A1 | 10/2015 | Rolston et al. |
| 2016/0282927 | A1 | 9/2016 | Adams et al. |
| 2017/0371661 | A1 | 12/2017 | Sparling |

OTHER PUBLICATIONS

Lethaby, Nick; Texas Instruments; "RTOS Power Management Emerges as a Key for MCU-Based IoT Nodes"; Mar. 2015; pp. 1-10.

Notice of Allowance on U.S. Appl. No. 15/195,563 dated Mar. 20, 2019.

Silicon Laboratories, Inc.; "Smart Autonomous 32-bit Microcontroller Peripherals Push the Boundaries of Ultra-Low-Power Embedded System Design"; Rev. 1.0; 2012, pp. 1-5.

STMicroelectronics; "AN2202 Application Note—STR73x Microcontroller Power Management"; Rev.2; Sep. 2006; pp. 1-12.

U.S. Office Action on U.S. Appl. No. 15/195,563 dated Apr. 4, 2018.

\* cited by examiner

| POWER PROFILE ID | ADD | DELETE | EDIT |
|---|---|---|---|
| PM1 | | | |
| PM2 | | | |
| PM3 ///////////// | | | |
| SLEEP   (LOWEST POWER) | | | |

| CLOCKS | POWER | I/O PORTS | CLOCK GATING |
|---|---|---|---|
| OPERATING POWER | LOW POWER ▼ | | |
| RAM MEMORY | ENABLED ▼ | | |
| UART | DISABLED ▼ | | |
| ⋮ | ⋮ | | |
| INTERRUPT CONTROLLER | ENABLED ▼ | | |
| ESTIMATED POWER | 40 mW | | |

*FIG. 6A*

| POWER PROFILE ID | ADD | DELETE | EDIT |
|---|---|---|---|
| PM1 ///////////// | | | |
| PM2 | | | |
| PM3 | | | |
| SLEEP   (LOWEST POWER) | | | |

| CLOCKS | POWER | I/O PORTS | CLOCK GATING |
|---|---|---|---|
| MCLK | ENABLED ▼ | 180 MHz ▼ | |
| ACLK | ENABLED ▼ | 48 MHz ▼ | |
| BCLK | ENABLED ▼ | 24 MHz ▼ | |
| ESTIMATED POWER | 950 mW | | |

*FIG. 6B*

METHOD AND APPARATUS FOR IMPLEMENTING POWER MODES IN MICROCONTROLLERS USING POWER PROFILES

CROSS-REFERENCE TO RELATED APPLICATIONS

The present application is a continuation of U.S. patent application Ser. No. 15/195,563 filed Jun. 28, 2016, now U.S. Pat. No. 10,372,184, the contents of which are incorporated herein by reference in their entirety.

BACKGROUND

A microcontroller (MCU) is a small computer formed on an integrated circuit. MCUs vary in size and complexity. However, nearly all MCUs contain a central processing unit (CPU), a read only program memory (e.g., flash memory) that stores an embedded program, a random access memory (RAM), one or more general purpose timers, and one or more general purpose input/output (GPIO) ports.

MCUs are employed in many types of products for many different markets consumer, medical, industrial, security, and others. Many of these products are battery powered. Thus power consumption is a key specification to which embedded program developers must pay close attention. Even if the system is line operated, power consumption can be a concern since many products are contained in sealed enclosures, and the heat produced during operation must be kept to a minimum to prevent such products from overheating. Energy efficient operation of MCUs also makes it possible to eliminate fans or other schemes designed to remove heat.

There are several factors that affect power consumption in MCUs. Clock speed and clock gating are two. MCUs generate clocks that drive the CPU and other components such as timers. Internal devices (e.g., phase-lock loops) that generate clock signals, and the components driven by the clocks, consume more power with higher clock speeds. Also MCUs typically employ a clock distribution tree that distributes clock signals throughout the MCU to components that need them. The power used to drive the tree can be a substantial portion of the total power used by MCU. The whole tree structure with gates at the ends and amplifiers in between have to be loaded and unloaded every clock cycle. To save energy, clock gating temporarily shuts off parts of the tree to those components that don't need clock signals. Voltage regulation is yet another important power factor. Reducing the operating voltage of the MCU has long been a traditional approach to power consumption reduction. As the voltage goes down, so does the operating power. Importantly, developers must pay close attention to power consumption when developing embedded programs.

SUMMARY

A method and apparatus for implementing power modes in MCUs is disclosed. In one embodiment of the method, a CPU of the MCU executes a first instruction that starts a subroutine or function stored in program memory. The first instruction passes a first parameter to the function or subroutine. Thereafter the CPU writes a first value to a first special function register (SFR) in response to executing the first instruction, wherein the first value is related to the first parameter. The MCU operates in a first power mode in response to the CPU writing the first value to the first SFR. The CPU also executes a second instruction that starts the subroutine or function. The second instruction passes a second parameter to the function or subroutine. The first and second parameters are distinct. The CPU writes a second value to a second SFR of the MCU in response to executing the second instruction, wherein the second value is related to the second parameter. The MCU operates in a second power mode in response to the CPU writing the second value to the second SFR. The MCU consumes more power operating in the first power mode than it does when operating in the second power mode.

BRIEF DESCRIPTION OF THE DRAWINGS

The present embodiments may be better understood in its numerous objects, features, and advantages made apparent to those skilled in the art by referencing the accompanying drawings.

FIG. 6A is an example user interface that can be used to create a power profile.

FIG. 6B is another example of user interface that can be used to create a power profile.

The use of the same reference symbols in different drawings indicates similar or identical items.

DETAILED DESCRIPTION

Figure 1:
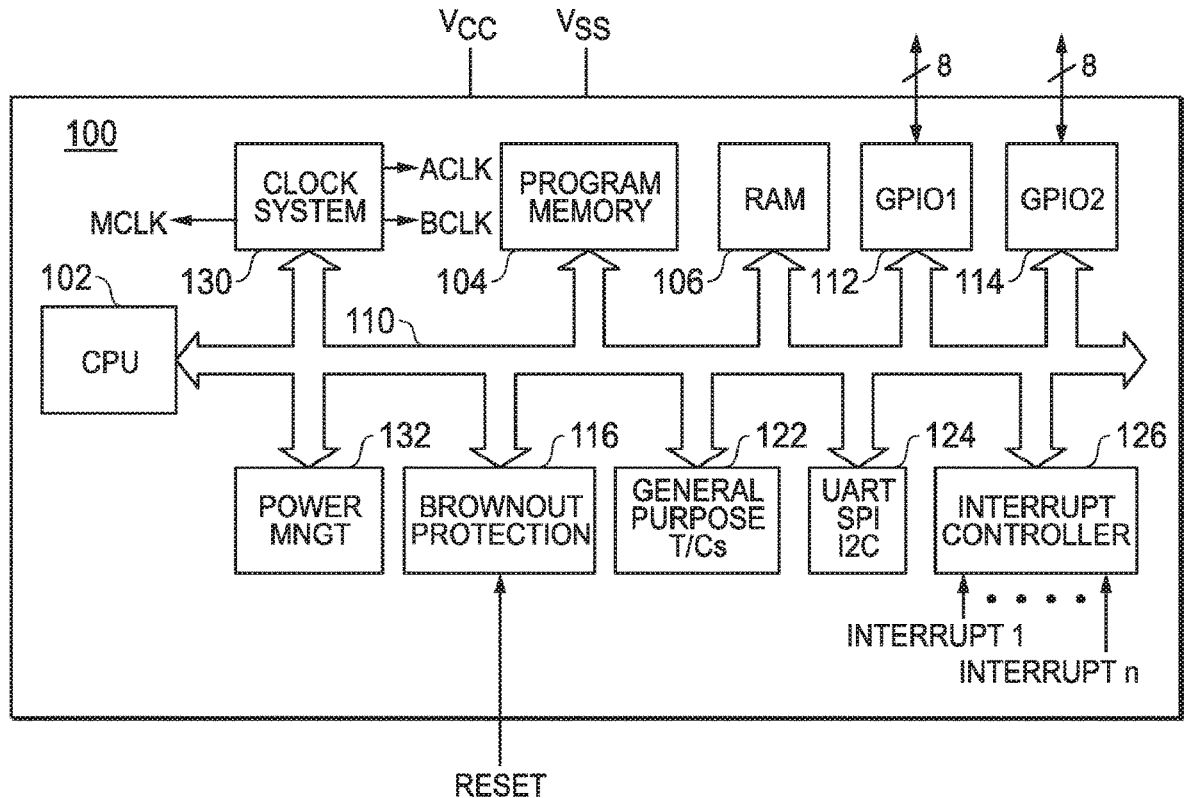
FIG. 1 is a block diagram of an example MCU in which one aspect of the present invention can be employed.

The disclosure is related to an apparatus and method for implementing power modes in an MCU during runtime using a function or subroutine (hereinafter power activation function) and respective power profiles. The disclosure also relates to an apparatus and method for creating power profiles. FIG. 1 is a block diagram of an example MCU 100 in which the power activation function can be employed. The term MCU should not be limited to that shown in FIG. 1.

MCU 100 includes a CPU 102, program memory (e.g., flash memory) 104 that stores an embedded program, and RAM 106. A communication system 110 contains separate instruction and data buses. CPU 102 can read instructions of an embedded program, including instructions of a power activation function, and data, including power profiles, from program memory 104 via the instruction bus. And CPU 102 can read/write data to RAM 106 and special function registers (SFRs) via the data bus. SFRs control or monitor various components of MCU 100. As will be explained below, CPU 102 can read power profiles, and write or update binary control values in SFRs in response to executing the power activation function. A value written to the SFRs can be a single bit or multiple bits. Values written to SFRs can affect power consumption in MCU 100.

In addition to CPU 102, program memory 104, RAM 106, and communication system 110, the MCU 100 includes additional components (i.e., peripherals) 112-132 as shown. GPIO ports 112 and 114 provide data transfer interfaces between MCU 100 and devices external to MCU 100. Pins of GPIO ports 112 and 114 can be configured by software (e.g., the embedded program) via associated SFRs. For example, pins of GPIO ports 112 and 114 can be configured as inputs or outputs by writing appropriate values to SFRs that control the GPIOs. The pins can also be configured by software to serve as interrupt lines that receive interrupt signals from external devices. Some of these interrupt signals can be used to wake-up MCU 100 when it is in a sleep mode or low power mode as will be more fully described below.

Brownout protection block 116 monitors the operating voltage supplied to CPU 102 and other components of MCU 100. If the operating voltage falls below a threshold voltage, brownout protection 116 forces a reset of the MCU, which includes implementing a reset program that begins at an address identified by a reset vector in program memory 104. A reset program can also be initiated in response to brownout protection block 116 receiving an externally generated reset signal. A watchdog (WD) timer 120 is a special hardware timer that automatically generates a reset if the embedded program neglects to periodically service it. It is often used to automatically reset an embedded MCU that hangs because of a software or hardware fault.

Timer block 122 contains various general purpose timers/counters. A timer/counter can be configured to measure elapsed time (e.g., counting clock signal ticks). A timer/counter can also be configured by software to count internal or external events. CPU 102 loads a count register with an initial value. A typical timer/counter will have some means to start the timer/counter once its count register is loaded, usually by setting a bit in an SFR. If a timer/counter is an up counter, it counts up from the initial value. A down timer/counter counts down. When the register count overflows, an output signal is asserted. The output signal may trigger an interrupt or set a bit that the CPU can read.

Serial interface block 124 includes various serial interface controllers (hereinafter interfaces) that are used for communicating with devices external to the MCU via a serial interface (not shown). For example, serial interface block 124 may include a universal asynchronous receiver transmitter (DART), an inter-integrated circuit (I2C), serial peripheral interface (SPI), and a universal serial bus (USB).

MCU 100 includes an interrupt controller 126 that receives interrupts or event signals that are internally generated. Interrupt controller can also receive externally generated interrupts or event signals via one or more pins of GPIO ports 112 and 114. Interrupt controllers operate to interrupt the sequential execution of instructions stored in program memory 104 in favor an interrupt service subroutine, which is also stored in program memory 104. In one embodiment, interrupt controller block 126 provides the program memory address of an interrupt service subroutine (ISSR), which corresponds to the interrupt signal received by interrupt controller block 126. CPU 102 implements the ISSR stored in program memory 104 beginning at the address provided by the interrupt controller block 126.

Clock system 130 generates and distributes clock signals to CPU 102 and other components of MCU 102. In the embodiment shown, clock system 130 generates at least three clocks ACLK, BCLK, and MCLK, it being understood that clock system 130 should not be limited thereto. In the embodiment shown, MCLK drives CPU 102, while ACLK and BCLK drive other components. Although not shown, clock system 130 includes a clock distribution tree (or clock tree) that distributes clock signal(s) to all the components that need them. In many MCUs, the power used to generate and distribute clock signals can be significant. Further, components consume a substantial amount of power when driven by their respective clock signals. To save energy, clock system 130 can be configured to reduce the speed of the clocks. Additionally clock system 130 can be configured to selectively prune the clock tree to further reduce power consumption. For maximum energy saving the PLLs in clock system 130 that generate the clock signals, are best powered down when the components they drive are expected to be inactive. When starting up, however, it takes time before a PLL is ready to provide a stable clock signal.

Power management block 132 includes one or more voltage regulators that regulate power supplied to CPU 102, program memory 104, RAM 106, etc. Power can be regulated by adjusting the voltage and/or current supplied to components. MCU 100 consumes less power when reduced current or voltage is supplied to the various components of MCU 100.

Figure 2:
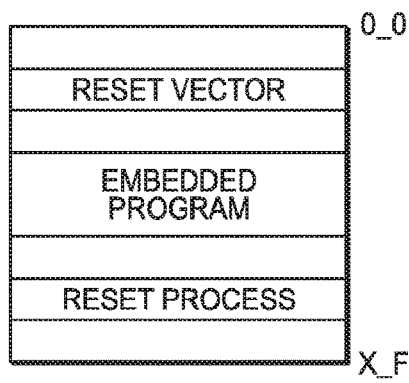
FIG. 2 is a graphical representation of address spaces in memories of the MCU shown in FIG. 1.
Figure 2:
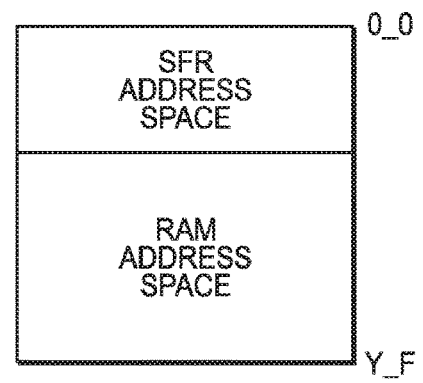

FIG. 2 illustrates the address space of program memory 104, and shows an embedded program 202 that includes a main function, subroutines, hardware abstraction layer (HAL) modules, application program interfaces (APIs), supporting data structures, etc. In one embodiment, embedded program 202 includes the power activation function and power profiles mentioned above. The power activation function can be invoked or started in response to CPU execution of an instruction in the main program or a subroutine thereof. Program memory 104 also includes a reset program whose memory location is identified by a reset vector. During a reset, the MCU looks to the reset vector to find the location in memory 104 where the reset program can be found and subsequently implemented before starting the main function of embedded program 202.

FIG. 2 also shows an address space for RAM 106 and the SFRs. Power consumed by MCU 100 depends on binary control values written by CPU 102 to SFRs that control components such as clock system 130, power management block 132, GPIO ports 112 and 114, etc. To illustrate, binary control values written to one or more SFRs that control clock system 130, determine the speed and gating of clocks provided to components including CPU 102. As noted above, the speed and gating of clocks is a large power consumption factor. Disabled components consume less power. Components, such the UART of interface block 124, can be disabled when the CPU writes appropriate binary control values to SFRs that control these components. CPU 102 can write binary control values to SFRs that control power consumed by GPIO ports 112 and 114. For example binary control values written to one or more of these SFRs determine whether weak or strong pullup resistors are internally applied at pins of GPIO ports 112 or 114. CPU 102 can write binary control values to one or more SFRs that determine the operating voltage and/or current (i.e., power) supplied to components by control power management block 132. The foregoing represents just a few of the SFRs that affect power consumption in MCU 100. Importantly, the CPU writes the binary control values to SFRs in accordance with the instructions of embedded program 202 including the power activation function.

MCU 100 can operate in various power modes. In power mode 1 (PM1) MCU 100 is configured so that clock system 130 generates clocks at full speed, power management block 132 provides power at full voltage and current to various components, etc. MCU 100 implements embedded program 202 and performs useful work while in PM1. MCU 100 consumes the most power when it operates in PM1. The MCU can be configured to operate in a lower power mode in which it consumes less power. For example, MCU 100 can operate in power mode 2 (PM2). This mode is similar to PM1, but with clock system 130 configured to generate MCLK at a slower speed. MCU 100 implements embedded program 202 and performs useful work in PM2, but CPU 102 consumes less power than it does when MCU is in PM1. Overall, MCU 100 consumes less power when it operates in PM2. MCU 100 can be configured to operate in power mode 3 (PM3) in which it consumes very little power. In PM3, critical components may be left active while high-frequency clocks and non-essential loads are disabled. For example, MCLK is disabled but clocks used to drive critical components are kept running, and voltage supplied to components such as program memory may be reduced. MCU 100 consumes less power when operating in PM3 when compared to the power consumed when MCU 100 operates in either PM1 or PM2. Other power modes are contemplated.

MCU 100 can transition between power modes. For example, MCU 100 can transition from PM3 to PM1 when, for example, brownout protection block 116 receives and externally generated reset signal. This transition may require a substantial amount of time to complete. In time sensitive systems, the del ay may be unacceptable. The time needed to transition from PM2 to PM1, is less than the time needed to transition the MCU from PM3 to PM1 mode. Unfortunately, MCU 100 consumes more power in a PM2 than it does in PM3.

Figure 3:
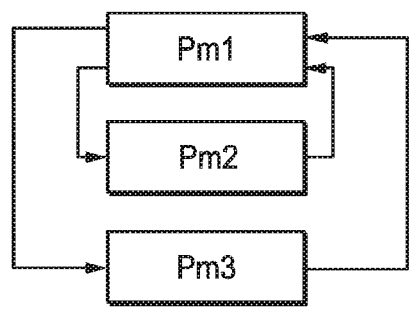
FIG. 3 illustrates control flow between power modes of the MCU shown in FIG. 1.

FIG. 3 represents control flow between the power mode examples described above.

The embedded program controls the flow between these modes. MCU 100 can transition between power modes when an event occurs such as the expiration of a timer, or when an external interrupt or reset signal is received. For example, imagine a battery powered blood glucose meter employing MCU 100, which spends most of the time in PM3 doing nothing except waiting for a button press or alarm to occur. Shortly after the button press or alarm, the MCU is put into PM2 with the slower clock speed. In PM2 the blood glucose meter displays a simple text based interface that does not require very much power to operate. But then the user tells the blood glucose meter to do some real work that requires the MCU to operate in PM1 with the fastest clock possible and consume a lot of power to complete. Once this work is done the MCU is put back into PM2. And after a period of inactivity the MCU is put back into PM3 in the interest of conserving battery life.

Power modes can be implemented using subroutines. Embedded program developers could add a separate subroutine to their embedded program for each power mode. During run time, one or the subroutines can be called and executed in order to place the MCU in a power mode such as PM2. Writing the subroutines, however, is a difficult and time consuming task. Before they can write the subroutines, embedded program developers need intimate knowledge and understanding of MCUs, which have become increasingly complex. A typical MCU user's manual can now exceed 1,000 pages. Components like the clock system 130, power management block 132, GPIOs 112 and 114, etc., have mushroomed in new features and capabilities, making them difficult to completely understand and properly configure into a desired mode of operation.

Unfortunately, the overall complexity of MCUs has led to errors when writing subroutine code to implement power modes. For example an improperly written subroutine may write the wrong binary control values to the wrong SFRs. Further, program developers must comply with subtle rules dictated by the underlying architecture of the MCU when writing subroutines for implementing power modes. For example the architecture of MCU 100 might require control values to be written to SFRs in a particular sequence in order for the MCU to transition gracefully (i.e., without creating a problem) from PM3 to PM1. Or MCU 100 may require a gradual increase in clock speed when transitioning from PM3 to PM1 in order to avoid a sudden drop of the operating voltage supplied to CPU 102 by power management block 132. To further illustrate the last point, transitioning immediately from one power mode in which MCLK is generated at 24 MHz to another power mode in which MCLK is generated at 180 MHz, may cause a substantial drop in the voltage of the supply provided to the CPU 102 or other components of MCU 100, which in turn may cause a brown out condition. Unless developers follow the rules dictated by a complex and lengthy MCU user's manual, their embedded programs may fail to implement power modes according to design specifications.

The present invention addresses these issues and provides a power activation function that implements power modes (e.g., PM1-PM3) according to user defined power profiles, which can be stored in a power profiles data object (e.g., a file, c structures, etc.). The power activation function can be provided by the manufacturer of the MCU or others who have a complete understanding of MCU architecture and the rules that must be followed when transitioning between power modes. The power activation function and power profiles data object can be added to an embedded program during development thereof. The present invention also provides an integrated system development environment tool that enables developers to create unique power profiles. This tool provides a graphical user interface in which users can select control values for power modes. In one embodiment, the tool generates one or more binary control values needed to implement a power mode (e.g., PM3) based on the control values entered into the graphical user interface. The tool may also identify the addresses of the one or more SFRs into which the binary control values are to be written. This enables the power activation function to write the binary control values directly to the identified SFRs during runtime. In another embodiment the power activation function writes the binary control values to SFRs via one or more HAL modules. In still another embodiment, the HAL modules at runtime may generate the binary control values for a power mode based on the control values entered via the graphical user interface. For purposes of explanation only, the present invention will be described with reference to a tool that (1) generates one or more binary control values for each power mode based on the control values entered into the tool's graphical user interface, and (2) identifies the SFRs by address into which the binary control values are to be written.

Once power profiles are created using the tool, they can be packaged into a power profiles data object and downloaded into program memory. For purposes of explanation only, the power profiles data object will take form in a simple look-up table that maps power profiles to power profile identifiers. At runtime, power profiles are read by the power activation function. The power activation function writes binary control values of the power profiles to SFRs that control power consumption in the MCU, either directly or indirectly via HAL modules. Thus, the power activation function operates to implement a power mode by writing one or more binary control values of a corresponding power profile to SFRs that control clock speed, clock gating, operating voltage, etc. For example, the power activation function can implement PM1 after reading the power profile for PM1 and writing the binary control values thereof to respective SFRs. And in response clock system 130 generates clocks at full speed, power management block 132 provides full power to CPU 102 and other components of MCU 100, strong pull down resistors are applied at pins of GPIO ports 112 and 114, etc. At a later time, the power activation function can write a whole new set of binary control values to SFRs in order to in order to implement PM2 or PM3 in accordance with another power profile. The new binary control values may disable a clock (e.g., MCLK), reduce the speed of other clocks, gate off portions of the clock tree, reduce current or voltage provided to one or more components, etc.

Figure 4:
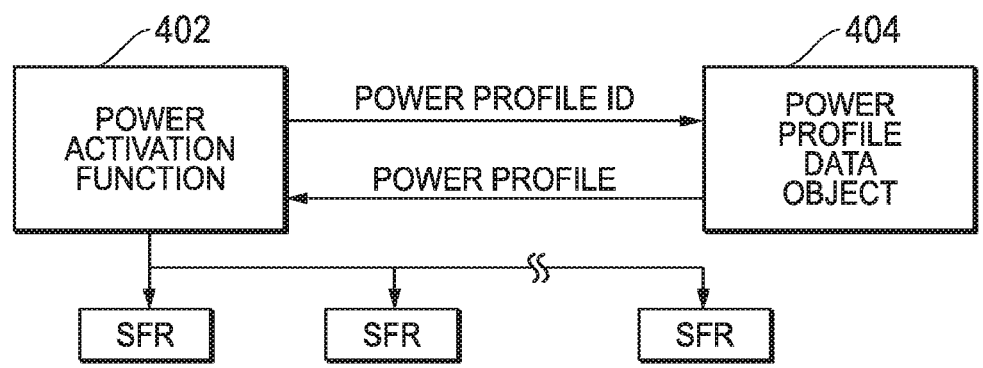
FIG. 4 illustrates a power activation function in data communication with a power profiles file stored in memory of the MCU of FIG. 1.

With continuing reference to FIGS. 1 and 2, FIG. 4 illustrates block diagram representations of power activation function 402 and a power profile data object 404. The power activation function 402 takes form in instructions executing on CPU 102. Power profile data object 404 is stored in program memory 104. The power activation function 402 can access power profiles data object 404 using a parameter (hereinafter power profile ID) that identifies a power profile in data object 404 that is passed via, for example, a subroutine call instruction of the main function or another subroutine thereof. For purposes of explanation, it will be presumed that embedded program 202 includes multiple subroutine call instructions to invoke power activation function 402. The call instructions are identical to each other, except for a power profile ID passed by the instruction to the power activation function. Several of the subroutine call instructions include a different power profile ID to be passed to the power activation function, and some of the call instructions may pass the same power profile ID. The power profiles data object 404 maps power profile IDs to respective power profiles. Each power profile contains one or more binary control values. Additionally, each power profile may contain the addresses or identities of SFRs where the binary control values are to be written. Additional information may be stored in each power profile.

Power activation function 402 accesses data object 404 and reads the contents of power profile that is identified by the power profile ID. In response to reading the power profile, the power activation function directly or indirectly (via one or more HAL modules) writes binary control values identified in the power profile to the appropriate SFRs, which may also be identified by respective addresses within the power profile. One of ordinary skill understands that writing the binary control values directly to SFRs identified in the power profile, reduces the time needed to transition MCU 100 between power modes. In other words, time is saved by avoiding the HAL modules.

In one embodiment, the binary control values may be written in the order in which they appear in the power profile. In one embodiment, power activation function 402 need not immediately write control values read from a power profile. For example, the power activation function 402 may read and process values from SFRs to determine, for example, whether the speed of clock MCLK must be gradually increased before a binary control value defined by the power profile is written to an SFR that controls clock system 130. In this manner, the power activation function 402 may gradually increase the speed of MCLK by writing successive binary control values to the SFR that controls the speed of MCLK in order to avoid a sudden drop of the supply voltage provided to components, including CPU 102. The binary control values contained in a power profile may not be the final binary control values written to SFRs during a power mode transition. For example, power activation function 402 may read one or more values contained within SFRs before writing binary control values retrieved from data object 404. The power activation function may process the one or more values and the binary control values of a power profile, to generate revised binary control values, which are subsequently written to respective SFRs.

Figure 5:
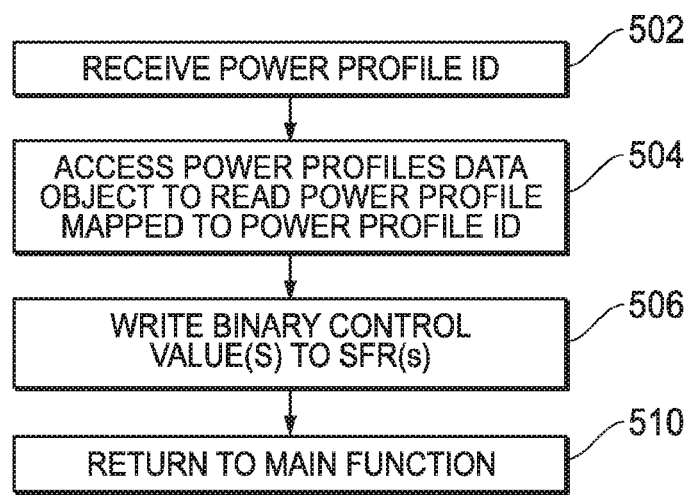
FIG. 5 is a flow chart illustrating relevant aspects of a process implemented by the power activation function shown in FIG. 4.

FIG. 5 illustrates an example process implemented by power activation function according to one embodiment. In step 502, the power activation function receives a power profile ID that is passed by execution of an instruction to invoke the power activation function. In response, the power profiles data object 404 is accessed to read binary control values of the power profile mapped to the power profile ID. In step 506, binary control values of the power profile are written directly or indirectly to respective SFRs. Thereafter, control can be returned to the main function (or a subroutine) of the embedded program as shown in step 510.

It is noted that power activation function 402 can be generic in that it can be used with many different types of MCU architectures. In another embodiment, power activation function 402 may configured for use in a specific MCU. Regardless, the power activation function 402 eliminates the need for program developers to add complex subroutines to their embedded programs for each power mode. Rather, program developers need only add subroutine call instructions or other instructions that pass respective power profile IDs to the power activation function in order to implement respective power modes at runtime. This greatly simplifies the task of developing an bug free embedded program for an MCU. As an aside, the power activation function can be downloaded to a computer system via the Internet, where it can be added to an embedded program for subsequent download to an MCU.

Power profiles can be created and subsequently downloaded into program memory 104 using the integrated system development environment (ISDE) tool mentioned above. In one embodiment, the tool (not shown, but hereinafter referred to as the power profile tool) may take form in instructions executing on a microprocessor of a computer system. Like the power activation function, the tool can be downloaded from a server computer system via the Internet.

FIGS. 6a and 6b illustrate example graphical user interfaces that are generated by the power profile tool. Graphical user interfaces like those shown in FIGS. 6a and 6b, enable a user to specify control values for power profiles. FIG. 6a illustrates an example interface for specifying control values for example power mode PM2 described above, and FIG. 6b illustrates an example interface for specifying control values for the example power mode PM1 also described above. A power profile identified by ID=PM1 can be created using the values entered into the interface of FIG. 6a, and a power profile identified by ID=PM2 can be created using the values entered into the interface of FIG. 6b.

FIG. 6a displays fields into which the user can specify control values for the "power management" of MCU 100 when it is placed in low power mode LPM. In the illustrated example, "low power" has been entered from a drop down box for the "operating power" variable. With this control value, power management block 132 will provide low voltage power during runtime to components of MCU 100 when MCU 100 implements the power mode identified by power profile ID=PM2. The interface of FIG. 6a also allows the user to enable or disable certain components of MCU 100. For example, the example interface shows that RAM memory is enabled and the UART is disabled, which means that RAM memory 106 will receive low power when MCU 100 implements the power mode identified by power profile ID=PM2, and the UART of interface block 124 will not receive power when MCU 100 implements the power mode identified by power profile ID=PM2. The display shown in FIG. 6*a* also includes a power estimation that is calculated by the power profile tool based on the control values for the power profile. The estimation is updated by the power profile tool with each change of a variable such as "operating power."

FIG. 6*b* displays fields into which the user can specify control values for the "clocks" of MCU 100 when it is placed in PM1. In the illustrated example, all clocks are enabled and their speed specified. With these control values clock system 130 will generate MCLK, ACLK, and BCLK with speeds of 180 MHz, 48 MHz, and 24 MHz, respectively, when MCU 100 implements the power mode identified by power profile ID=PM1.

After a user creates the power profiles for his embedded program, the power profile tool links each power profile to its respective, user-selected power profile ID (e.g., PM1) in a map, which in turn can be downloaded into program memory 104 as power profile data object 404. During runtime, power activation function 402 can read the contents of a power profile in data object 404 using the power profile ID passed to power activation function 402 via an instruction that invokes the power activation function. In response power activation function 402 can write one or more binary control values to SFRs via one or more HAL modules. The use of the HAL modules in this manner may unduly slow the transition between power modes in MCU 100. In an alternative embodiment that addresses this delay, the power profile tool may determine the addresses for the SFRs of MCU 100 into which the binary control values will be written. The calculated binary control values and SFR addresses are collected as a power profile and then linked to a power profile ID (e.g., PM1) in a table before they are downloaded into program memory 104 as part of the embedded program. In this embodiment, the power profiles in data object 404 contain one or more binary control values and respective SFR addresses, and the binary control values can be written by power activation function 402 directly to the SFRs. In other words, there is no need to invoke the HAL modules in this embodiment.

The power activation function eliminates the need to add subroutines or other code for implementing respective power modes in embedded programs. One of ordinary skill will understand that creating power profiles using the tool described above is easier than creating subroutines or other code for implementing individual power modes. The power activation function occupies a set amount of space in program memory 104. In contrast, the size of an embedded program will grow with the addition of each subroutine or other code needed for implementing respective power modes. Thus, one advantage of the power activation function over the use of subroutines or other code for implementing power modes, is that the power activation function can make embedded programs more compact. Further, power activation functions can be delivered (e.g., transmitted via the Internet) to embedded program developers after being tested for reliability. As a result the power activation function should not generate errors after it is added to an embedded program. The same cannot be said for subroutines or other code written and added to an embedded program by developers thereof.

Though the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method implemented in a microcontroller (MCU) that comprises a central processing unit (CPU) and a memory, the method comprising:
   the CPU executing a first function call instruction for activating a function stored in the memory, wherein the first function call instruction comprises a first power profile identification parameter to be passed to the function;
   the CPU, in response to executing the first function call instruction, accessing a data structure stored in the memory to read first data that is mapped to the first power profile identification parameter;
   the CPU, in response to executing the first function call instruction, processing the first data to generate a first value;
   the CPU writing the first value to a first special function register (SFR) of the MCU in response to executing the first function call instruction, wherein the first value is related to the first power profile identification parameter;
   the MCU operating in a first power mode in response to the CPU writing the first value to the first SFR;
   the CPU executing a second function call instruction for activating the function, wherein the second function call instruction comprises a second power profile identification parameter to be passed to the function;
   the CPU, in response to executing the second function call instruction, accessing the data structure stored in the memory to read second data that is mapped to the second power profile identification parameter;
   the CPU, in response to executing the second function call instruction, processing the second data to generate a second value;
   the CPU writing the second value to a second SFR of the MCU in response to executing the second function call instruction, wherein the second value is related to the second power profile identification parameter; and
   the MCU operating in a second power mode in response to the CPU writing the second value to the second SFR,
   wherein the MCU consumes more power operating in the first power mode than it does when operating in the second power mode.

2. The method of claim 1, wherein at least one of the first and second SFRs controls one or both of speed and gating of clocks in the MCU, and wherein the values written to the at least one of the first and second SFRs specify a predetermined clock speed and/or gating.

3. The method of claim 1, wherein at least one of the first and second SFRs controls one or both of operating voltage and current supplied to components in the MCU, and wherein the values written to the at least one of the first and second SFRs specify a predetermined operating voltage and/or current.

4. The method of claim 1 further comprising:
   the CPU, in response to executing the first function call instruction, accessing one or more SFRs to read first contents thereof; and
   the CPU, in response to executing the first function call instruction, processing the first contents and the first data to generate the first value.

5. The method of claim 4 wherein the first SFR is one of the one or more SFRs.

6. The method of claim 1 wherein the data structure maps a plurality of power profile identification parameters to a plurality of values, respectively, wherein the data structure was created using a graphical user interface before the data structure is written to the memory.

7. A memory storing instructions wherein a method is implemented in response to executing the instructions, the method comprising:
- a CPU, in response to executing a first function call instruction, accessing a data structure stored in a memory of an MCU to read first data that is mapped to a first power profile identification parameter;
- the CPU, in response to executing the first function call instruction, processing the first data to generate a first value;
- the CPU writing the first value to a first special function register (SFR) of the MCU in response to executing the first function call instruction, the first function call instruction comprising the first power profile identification parameter, and the first value being related to the first power profile identification parameter;
- the CPU, in response to executing a second function call instruction, accessing the data structure stored in the memory of the MCU to read second data that is mapped to a second power profile identification parameter;
- the CPU, in response to executing the second function call instruction, processing the second data to generate a second value; and
- the CPU writing the second value to a second SFR of the MCU in response to executing the second function call instruction, the second function call instruction comprising the second power profile identification parameter, and the second value being related to the second power profile identification parameter,
- wherein the MCU is configured to operate in a first power mode in response to the CPU writing the first value to the first SFR,
- wherein the MCU is configured to operate in a second power mode in response to the CPU writing the second value to the second SFR, and
- wherein the MCU consumes more power when operating in the first power mode than it does when operating in the second power mode.

8. The memory of claim 7, wherein at least one of the first and second SFRs controls one or both of speed and gating of clocks in the MCU, and wherein the values written to the at least one of the first and second SFRs specify a predetermined clock speed and/or gating.

9. The memory of claim 7 wherein the method further comprises:
- the CPU, in response to executing the first function call instruction, accessing one or more SFRs to read first contents thereof; and
- the CPU, in response to executing the first function call instruction, processing the first contents and the first data to generate the first value.

10. The memory of claim 9 wherein the first SFR is one of the one or more SFRs.

11. The memory of claim 7 wherein the data structure maps a plurality of power profile identification parameters to a plurality of values, respectively, wherein the data structure is created using a graphical user interface before the data structure is written to the memory of the MCU.

12. A method comprising:
- downloading a set of instructions to a computer system for subsequent download to a memory of an MCU, wherein the set of instructions when executed by a CPU of the MCU, implements a first method, the first method comprising:
  - the CPU, in response to executing a first function call instruction, accessing a data structure stored in the memory of the MCU to read first data that is mapped to a first power profile identification parameter;
  - the CPU, in response to executing the first function call instruction, processing the first data to generate a first value;
  - the CPU writing the first value to a first special function register (SFR) of the MCU in response to executing the first function call instruction, the first function call instruction comprising the first power profile identification parameter, and the first value being related to the first power profile identification parameter;
  - the CPU, in response to executing a second function call instruction, accessing the data structure stored in the memory of the MCU to read second data that is mapped to a second power profile identification parameter;
  - the CPU, in response to executing the second function call instruction, processing the second data to generate a second value; and
  - the CPU writing the second value to a second SFR of the MCU in response to executing the second function call instruction, the second function call instruction comprising a second power profile identification parameter, and the second value being related to the second power profile identification parameter,
  - wherein the MCU is configured to operate in a first power mode in response to the CPU writing the first value to the first SFR,
  - wherein the MCU is configured to operate in a second power mode in response to the CPU writing the second value to the second SFR, and
  - wherein the MCU consumes more power when operating in the first power mode than it does when operating in the second power mode.

13. The method of claim 12 wherein the first method further comprises transmitting a second set of instructions to the computer system, wherein the computer system can implement a second method in response to executing the second set of instructions, the second method comprising:
- displaying a graphical user interface;
- generating the data structure based on control values entered into the graphical user interface.

* * * * *